US007344668B2

(12) United States Patent
Tam et al.

(10) Patent No.: US 7,344,668 B2
(45) Date of Patent: Mar. 18, 2008

(54) PROCESS FOR DRAWING GEL-SPUN POLYETHYLENE YARNS

(75) Inventors: Thomas Y-T. Tam, Richmond, VA (US); Chok Bin Tan, Richmond, VA (US); Lori L. Wagner, Richmond, VA (US); Charles R. Arnett, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 432 days.

(21) Appl. No.: 10/699,416

(22) Filed: Oct. 31, 2003

(65) Prior Publication Data

US 2005/0093200 A1    May 5, 2005

(51) Int. Cl.
*B29C 47/88* (2006.01)
*D01F 6/04* (2006.01)
*D01D 5/12* (2006.01)
*D01D 5/04* (2006.01)

(52) U.S. Cl. ............................... 264/210.8; 264/211.17
(58) Field of Classification Search ............... 264/103, 264/210.8, 211.17
See application file for complete search history.

(56) References Cited

U.S. PATENT DOCUMENTS

| | | | | |
|---|---|---|---|---|
| 4,248,577 | A | * 2/1981 | Bory et al. | ............... 425/131.5 |
| 4,411,854 | A | 10/1983 | Maurer et al. | ............... 264/205 |
| 4,413,110 | A | 11/1983 | Kavesh et al. | ............... 526/348 |
| 4,422,993 | A | 12/1983 | Smith et al. | ............. 264/210.8 |
| 4,430,383 | A | 2/1984 | Smith et al. | ................. 428/364 |
| 4,436,689 | A | 3/1984 | Smith et al. | ................ 264/204 |
| 4,536,536 | A | 8/1985 | Kavesh et al. | ............... 534/462 |
| 4,545,950 | A | 10/1985 | Motooka et al. | ......... 264/210.8 |
| 4,551,296 | A | 11/1985 | Kavesh et al. | ............... 264/177 |
| 4,612,148 | A | 9/1986 | Motooka et al. | .............. 264/49 |
| 4,617,233 | A | 10/1986 | Ohta et al. | ................... 428/364 |
| 4,663,101 | A | 5/1987 | Kavesh et al. | ............... 264/178 |
| 5,032,338 | A | 7/1991 | Weedon et al. | ............. 264/203 |
| 5,045,258 | A | * 9/1991 | van Breen et al. | ............ 264/85 |
| 5,246,657 | A | 9/1993 | Yagi et al. | ................ 264/210.6 |
| 5,286,435 | A | 2/1994 | Slutsker et al. | ............. 264/205 |
| 5,342,567 | A | 8/1994 | Chen et al. | .................. 264/203 |
| 5,505,900 | A | * 4/1996 | Suwanda et al. | ........... 264/477 |
| 5,578,374 | A | 11/1996 | Dunbar et al. | .............. 428/364 |
| 5,736,244 | A | 4/1998 | Kavesh et al. | .............. 428/364 |
| 5,741,451 | A | 4/1998 | Dunbar et al. | .............. 264/103 |
| 5,958,582 | A | 9/1999 | Dunbar et al. | .............. 428/364 |
| 5,972,498 | A | 10/1999 | Kavesh et al. | .............. 428/364 |
| 6,448,359 | B1 | 9/2002 | Kavesh | ........................ 526/352 |

FOREIGN PATENT DOCUMENTS

| | | |
|---|---|---|
| EP | 0 077590 | 4/1983 |
| EP | 0 320 188 A2 | 6/1989 |
| GB | 2042414 A | 9/1980 |
| JP | A-60/52647 | 8/1983 |
| JP | 238416-1995 | 9/1995 |

OTHER PUBLICATIONS

Robert H. Perry, Perry's Chemical Engineers' Handbook, 1984, McGraw-Hill Book Company, Sixth Edition, pp. 10-5 and 10-14 through 10-16.*
Eckert and Drake, Heat and Mass Transfer, McGraw-Hill Book Company, 1959, p. 121.
P. Smith et al., "Ultrahigh-Strength Polyethylene Filaments by Solution Spinning/Drawing, 2, Influence of Solvent on the Drawability" *Macromol. Chem.*, 180, 2983 (1979).
P. Smith et al., "Ultra-high-strength Polyethylene Filaments by Solution Spinning/Drawing" *J. Matl. Sci*, 15, 505, 1980.
Kalb et al., Hot Drawing of Porous High Molecular Weight Polyethylene, *Polymer*, 21, 3 (1980).
J. Smook et al., "Influence of Spinning/Hot Drawing Conditions on the Tensile Strength of Porous High Molecular Weight Polyethylene", *Poly. Bull.*, 2, 775 (1980).
J. Smook et al., "the Effect of Temperature and Deformation Rate on the Hot Drawing Behavlior of Porous High-Molecular Weight PE Fibers", *J.Appl. Poly.Sci.*,27,2209 (1982).
B. Kalb et al.,"Spinning of High Molecular Weight PESolution and Subsequent Drawing in A Temperature Gradient", *Poly. Bull.*, 1, 871 (1979).
J. Smook et. al.,"Elastic Flow Instabilities and Shish-Kebab Formation During Gel-Spinning Of Ultra-High Molecular Weight Polyethylene", *J. Matl. Sci*. 19, 31 (1984).
A.J. Pennings et al., "Mechanical Properties of Ultra-High Molecular Weight PE Fibres in Relation to Structural Changes and Chain Scissioning Upon Spinning and Hot Drawing", *J. Matl. Sci.*, 19, 3443 (1984).
J.P.Penning et al., "The Effect of Fibre Diameter on the Drawing Behaviour of Gel-Spun Ultra-High Molecular Weight PE Fibres", *Poly. Bull.*, 31, 243 (1993).
P. Smith et al., Ultradrawing of High Molecular Weight PE Cast From Solution. II. Influence of Polymer Concentration, *J. Poly. Sci., Poly. Phys. Ed.*, 19, 877 (1981).

* cited by examiner

*Primary Examiner*—Christina Johnson
*Assistant Examiner*—Patrick Butler
(74) *Attorney, Agent, or Firm*—Bruce Bradford

(57) ABSTRACT

A process for drawing essentially diluent-free gel-spun polyethylene multi-filament yarns in a forced convection air oven and the drawn yarns produced thereby, The process conditions of draw ratio, stretch rate, residence time, oven length and feed speed are selected in specific relation to one another so as to achieve enhanced efficiency and productivity. The drawn yarns are useful in armor, composites, fishing line, ropes, sutures, fabrics and other applications.

28 Claims, No Drawings

PROCESS FOR DRAWING GEL-SPUN POLYETHYLENE YARNS

BACKGROUND OF THE INVENTION

1. Field of the Invention

This invention relates to a process for drawing gel-spun polyethylene multi-filament yarns and the drawn yarns produced thereby. The drawn yarns are useful in armor, composites, fishing line, ropes, sutures, fabrics and other applications.

2. Description of the Related Art

Gel-spun polyethylene fibers are prepared from ultrahigh molecular weight polyethylene (UHMW PE). The preparation and drawing of UHMW PE filaments in the gel state was first described by P. Smith, P. J. Lemstra, B. Kalb and A. J. Pennings, *Poly. Bull.*, 1, 731 (1979). Single filaments were spun from 2 wt. % solution in decalin, cooled to a gel state and then stretched while evaporating the decalin in a hot air oven at 100 to 140° C.

Further descriptions of the drawing of polyethylene filaments containing substantial concentrations of solvent such as decalin or wax were described for example in P. Smith and P. J. Lemstra, *Macromol. Chem.*, 180, 2983 (1979); J. Matl. Sci., 15, 505 (1980); and in GB 2,042,414A; U.S. Pat. No. 4,411,854; U.S. Pat. No. 4,422,993; U.S. Pat. No. 4,430,383; U.S. Pat. No. 4,436,689; EP 0 077,590; U.S. Pat. No. 4,617,233; U.S. Pat. Nos. 4,545,950; 4,612,148; U.S. Pat. No. 5,246,657; U.S. Pat. No. 5,342,567; EP 0 320,188 A2 and JP-A-60/5264.

Some of the problems associated with drawing of polyethylene in a gel state were discussed in Japan Kokai Patent Publication 238416-1995. If the drawing is conducted at a high temperature without prior removal of a solvent, melt fusion occurs and so it is necessary to lower the drawing temperature. However, at a lower temperature it is impossible to conduct the drawing to the high draw ratio necessary to obtain high strength.

The drawing of gel-spun high strength polyethylene filaments in essentially a diluent-free state was first described by B. Kalb and A. J. Pennings, *Poly. Bull.*, 1, 871 (1979). Single filaments were spun from dodecane solution and simultaneously dried and stretched in a heated tube under an increasing temperature of 100 to 148° C. A dried filament of about 10 g/d tenacity was then re-stretched at 153° C. to a tenacity of about 29 g/d.

Further descriptions of the drawing of gel-spun polyethylene filaments in an essentially diluent-free state were described for example in B. Kalb and A. J. Pennings, *Polymer*, 21, 3 (1980); J. Smook et. al, *Poly. Bull.*, 2, 775 (1980); P. Smith et el., *J. Poly Sci., Poly Phys. Ed.*, 19, 877 (1981); J. Smook and A. J. Pennings, *J. Appl. Poly. Sci.*, 27, 2209 (1982), *J. Matl. Sci.*, 19, 31 (1984), *J. Matl. Sci.*, 19, 3443 (1984); J. P. Penning et al., *Poly. Bull.*, 31, 243 (1993); Japan Kokai Patent Publication 238416-1995; and in U.S. Pat. Nos. 4,413,110; 4,536, 536; 4,551,296; 4,663,101; 5,032,338; 5,286,435; 5,578,374; 5,736,244; 5,741,451; 5,958,582; 5,972,498; and 6,448,359 B1.

Each of these references represented an advance in the state of the art, however none suggests the process of this invention, and none satisfies all of the needs met by this invention.

There may be several motivations for drawing gel-spun polyethylene filaments and yarns. The end-use applications may require low filament denier or low yarn denier. Low filament deniers are difficult to produce in the gel spinning process. Solutions of UHMW PE are of high viscosity and may require excessive pressures to extrude through small spinneret openings. Hence, use of spinnerets with larger openings and subsequent drawing may be a preferable approach to producing fine denier filaments.

Another motivation for drawing may be a need for high tensile properties. Tensile properties of gel-spun polyethylene filaments generally improve with increased draw ratio if appropriately conducted.

Yet another motivation for drawing may be to produce a special microstructure in the filaments that may be especially favorable for particular properties, for example, ballistic resistance.

Each of these motivations must be balanced against the efficiency, productivity and cost of the drawing operation. Drawing of gel-spun polyethylene yarns requires the use of high horsepower motors and heavy rolls. Drawing speeds and productivity are limited by breakage of filaments. A need exists to identify drawing processes that permit the accomplishment of objectives of reducing denier and increasing yarn properties with enhanced efficiency, productivity and lower cost.

SUMMARY OF THE INVENTION

The invention is a process for drawing multi-filament gel-spun polyethylene yarns comprising the steps of:

a) forming a gel-spun polyethylene multi-filament feed yarn comprising a polyethylene having an intrinsic viscosity in decalin at 135° C. of from 5 dl/g to 35 dl/g, fewer than two methyl groups per thousand carbon atoms, and less than 2 wt. % of other constituents;

b) passing said feed yarn at a speed of $V_1$ meters/minute into a forced convection air oven having a yarn path length of L meters, wherein one or more zones are present along the yarn path having zone temperatures from 130° C. to 160° C.; and c) passing said feed yarn continuously through said oven and out of said oven at an exit speed of $V_2$ meters/minute wherein the following equations are satisfied $$0.25 \leq L/V_1 \leq 20, \text{ min} \quad \text{Eq. 1a}$$

$$1.5 \leq V_2/V_1 \leq 20 \quad \text{Eq. 1b}$$

$$1 \leq (V_2-V_1)/L \leq 60, \text{ min}^{-1} \quad \text{Eq. 1c}$$

$$0.55 \leq 2L/(V_1+V_2) \leq 10, \text{ min} \quad \text{Eq. 1d}$$

The invention is also a process for drawing multi-filament gel-spun polyethylene yarns comprising the steps of:

a) forming a gel-spun polyethylene multi-filament feed yarn comprising a polyethylene having an intrinsic viscosity in decalin at 135° C. of from 5 dl/g to 35 dl/g, fewer than two methyl groups per thousand carbon atoms, and less than 2 wt. % of other constituents;

b) passing said feed yarn at a speed of $V_1$ meters/minute into a forced convection air oven having a yarn path length of L meters, wherein one or more zones are present along the yarn path having zone temperatures from 130° C. to 160° C.; and c) passing said feed yarn continuously through said oven and out of said oven at an exit speed of $V_2$ meters/minute wherein the following equations are satisfied $$1 \leq L/V_1 \leq 20, \text{ min} \quad \text{Eq. 2a}$$

$$1.5 \leq V_2/V_1 \leq 20 \quad \text{Eq. 2b}$$

$$0.01 \leq (V_2 - V_1)/L \leq 1, \text{min}^{-1} \qquad \text{Eq. 2c}$$

$$1.1 \leq 2L/(V_1 + V_2) \leq 10, \text{min.} \qquad \text{Eq. 2d}$$

The invention also comprises gel-spun polyethylene yarns drawn by either of the above processes.

DETAILED DESCRIPTION OF THE INVENTION

The invention is a process for drawing gel-spun polyethylene multi-filament yarns in essentially a diluent-free state and the drawn yarns produced thereby. Gel-spun polyethylene fibers are prepared from ultrahigh molecular weight polyethylene (UHMW PE). UHMW PE is herein defined as having an intrinsic viscosity in decalin at 135° C. of from 5 to 35 dl/g.

Several processes are known for preparing gel-spun UHMW PE filaments. Gel spinning involves the dissolution of the UHMW PE in a solvent at elevated temperature, extrusion of a solution filament and the cooling of the solution filament to a gel state. The gel state may be rubber-like if the spinning solvent is a liquid, or it may be rigid if the spinning solvent is a wax. Gel spinning methods are described for example, in many of the references cited above. The spinning solvent is generally removed from the gel filament by evaporation or extraction. It is preferred that the gel spinning method for preparing the diluent-free feed material for the drawing process of this invention is as described in U.S. Pat. Nos. 4,422,993, 4,551,296, 4,663,101, 5,246,657 or 6,448,359 B1 herein incorporated by reference to the extent not incompatible herewith.

The present invention is a method for drawing a multi-filament gel-spun yarn after the spinning solvent has been removed and the polymer comprising the filaments is in an essentially diluent-free state containing less than 2 wt. % of constituents other than UHMW PE. Preferably, the polymer comprising the filaments contains less than 1 wt. % of other constituents, and more preferably less than 0.5 wt. % of other constituents. The multi-filament yarn may additionally have materials applied externally to the filaments, such as anti-static agents and spin finishes. Many anti-static agents and spin finishes are known and are available to the man skilled in the art. Solvents for polyethylene are not included in the materials that may be applied externally to the yarn. Such solvents will diffuse into the yarn and unfavorably change its draw characteristics in the manner previously discussed. Preferably, the external agents comprise less than 1 wt. % of the yarn. It will be understood that the term wt. % as used herein has the commonly accepted meaning of the weight of a constituent of a given material in proportion to the sum of the weights of all constituents of that material, expressed as a percent.

In a first embodiment, the process of the invention comprises the steps of:

a) forming a gel-spun polyethylene multi-filament feed yarn comprising a polyethylene having an intrinsic viscosity in decalin at 135° C. of from 5 dl/g to 35 dl/g, fewer than two methyl groups per thousand carbon atoms, and less than 2 wt. % of other constituents;

b) passing said feed yarn at a speed of $V_1$ meters/minute into a forced convection air oven having a yarn path length of L meters, wherein one or more zones are present along the yarn path having zone temperatures from 130° C. to 160° C.; and c) passing said yarn continuously through said oven and out of said oven at an exit speed of $V_2$ meters/minute wherein the following equations are satisfied $$0.25 \leq L/V_1 \leq 20, \text{min} \qquad \text{Eq. 1a}$$

$$1.5 \leq V_2/V_1 \leq 20 \qquad \text{Eq. 1b}$$

$$1 \leq (V_2 - V_1)/L \leq 60, \text{min}^{-1} \qquad \text{Eq. 1c}$$

$$0.55 \leq 2L/(V_1 + V_2) \leq 10, \text{min.} \qquad \text{Eq. 1d}$$

A second embodiment of the process of the invention comprises the steps of:

a) forming a gel-spun polyethylene multi-filament feed yarn comprising a polyethylene having an intrinsic viscosity in decalin at 135° C. of from 5 dl/g to 35 dl/g, fewer than two methyl groups per thousand carbon atoms, and less than 2 wt. % of other constituents;

b) passing said feed yarn at a speed of $V_1$ meters/minute into a forced convection air oven having a yarn path length of L meters, wherein one or more zones are present along the yarn path having zone temperatures from 130° C. to 160° C.; and c) passing said yarn continuously through said oven and out of said oven at an exit speed of $V_2$ meters/minute wherein the following equations are satisfied $$1 \leq L/V_1 \leq 20, \text{min} \qquad \text{Eq. 2a}$$

$$1.5 \leq V_2/V_1 \leq 20 \qquad \text{Eq. 2b}$$

$$0.01 \leq (V_2 - V_1)/L \leq 1, \text{min}^{-1} \qquad \text{Eq. 2c}$$

$$1.1 \leq 2L/(V_1 + V_2) \leq 10, \text{min.} \qquad \text{Eq. 2d}$$

The multi-filament gel-spun yarn to be drawn by the process of the invention comprises a polyethylene having an intrinsic viscosity in decalin of from 5 dl/g to 35 dl/g and fewer than 2 methyl groups per thousand carbon atoms and less than 2 wt. % of constituents other than UHMW PE, such as residual spinning solvent or extraction solvent. These limitations in the selection of a feed yarn for the process of the invention are necessary to assure that the drawing process will be effective and productive.

Preferably, the multi-filament yarn to be drawn comprises a polyethylene having an intrinsic viscosity in decalin of from 8 to 30 dl/g, more preferably, 10 to 25 dl/g, and most preferably from 12 to 20 dl/g. Preferably, the multi-filament yarn to be drawn comprises a polyethylene having fewer than one methyl group per thousand carbon atoms, and more preferably, fewer than 0.5 methyl groups per thousand carbon atoms and less than 1 wt. % of other constituents.

The gel-spun polyethylene multi-filament yarn to be drawn in the process of the invention may have been previously drawn, or it may be in an essentially undrawn state. The tenacity of the feed yarn may from 6 to 76 grams per denier (g/d) as measured by ASTM D2256-97 at a gauge length of 10 inches (25.4 cm) and at a strain rate of 100%/min. Preferably, the tenacity of the feed yarn is from 11 to 66 g/d. More preferably, the tenacity of the feed yarn is from 16 to 56 g/d. Yet more preferably, the tenacity of the feed yarn is from 21 to 51 g/d. Most preferably, the tenacity of the feed yarn is from 26 to 46 g/d.

It is known that gel-spun polyethylene yarns may experience drawing during spinning and may be drawn after spinning, for example in an oven, in a hot tube, between heated rolls, or on a heated surface. WO 02/34980 A1 describes a particular drawing oven. We have found that drawing of gel-spun UHMW PE multi-filament yarns is most effective and productive if accomplished in a forced convection air oven under narrowly defined conditions. It is necessary that one or more temperature controlled zones exist in the oven along the yarn path, each zone having a temperature from 130° C. to 160° C. Preferably the temperature within a zone is controlled to vary less than ±2° C. (a total less than 4° C.). More preferably the temperature within a zone is controlled to vary less than ±1° C. (a total less than 2° C.).

The yarn will generally enter the drawing oven at a temperature less than the oven temperature. On the other hand, drawing of a yarn is a dissipative process generating heat. Therefore to quickly heat the yarn to the drawing temperature, and to maintain the yarn at a controlled temperature, it is necessary to have effective heat transmission between the yarn and the oven air. Preferably, the air circulation within the oven is in a turbulent state. Preferably, the time-averaged air velocity in the vicinity of the yarn is from 1 to 200 meters/min. More preferably, the time-averaged air velocity in the vicinity of the yarn is from 2 to 100 meters/min. Most preferably, the time-averaged air velocity in the vicinity of the yarn is from 5 to 100 meters/min.

The yarn path within the oven may be in a straight line from inlet to outlet. Alternatively, the yarn path may follow a reciprocating ("zig-zag") path, up and down, and/or back and forth across the oven, around idler rolls or internal driven rolls. It is preferred that the yarn path within the oven is a straight line from inlet to outlet.

The yarn tension profile within the oven is adjustable by controlling the drag on idler rolls, or by adjusting the speed of internal driven rolls, or by adjustment of the oven temperature profile. The yarn tension within the oven may follow an alternating rising and falling profile, or it may increase steadily from inlet to outlet, or it may be constant. Preferably, the yarn tension everywhere within the oven is constant neglecting the effect of air drag, or it increases through the oven. Most preferably, the yarn tension everywhere within the oven is constant neglecting the effect of air drag.

The drawing process of the invention provides for drawing multiple yarn ends simultaneously. Typically, multiple packages of gel-spun polyethylene yarns to be drawn are placed on a creel. Multiple yarns ends are fed in parallel from the creel through a first set of rolls that set the feed speed into the drawing oven, and thence through the oven and out to a final set of rolls that set the yarn exit speed and also cool the yarn to room temperature under tension. The tension in the yarn during cooling is maintained sufficient to hold the yarn at its drawn length neglecting thermal contraction.

The inventive process provides for draw ratios ($V_2/V_1$) through the oven of from 1.5 to 20. To accomplish the objectives of the invention, the yarn feed speed must be chosen in relation to the length of the yarn path in the oven. Specifically, the relationship between the yarn path length in the oven, L (in meters), and the yarn feed speed, $V_1$ (in meters/min), must be such that the following equation is satisfied.

$$0.25 \leq L/V_1 \leq 20, \text{ min.}$$

More narrowly, in the second embodiment of the process of the invention, the following equation must be satisfied:

$$1 \leq L/V_1 \leq 20, \text{ min.}$$

Additionally, the yarn draw rate within the oven must be within specific limits. The yarn draw rate is here defined as the quantity $(V_2-V_1)/L$ (in $\text{min}^{-1}$). For the first embodiment of the process of the invention, the yarn draw rate must satisfy the following equation:

$$1 \leq (V_2-V_1)/L \leq 60, \text{ min}^{-1}.$$

More narrowly, in the second embodiment of the process of the invention, the following equation must be satisfied:

$$0.01 \leq (V_2-V_1)/L \leq 1, \text{ min}^{-1}.$$

A still further requirement to accomplish the purposes of the invention is restriction of the nominal residence time to specific limits. The nominal residence time of the yarn in the oven is here defined as the quantity $2L/(V_1+V_2)$ (in minutes). For the first embodiment of the process of the invention, the nominal residence time must satisfy the following equation:

$$0.55 \leq 2L/(V_1+V_2) \leq 10, \text{ min.}$$

More narrowly, in the second embodiment of the process of the invention, the following equation must be satisfied:

$$1.1 \leq 2L/(V_1+V_2) \leq 10, \text{ min.}$$

The productivity of the drawing process may be measured by the weight of drawn yarn that can be produced per unit of time per yarn end. Preferably, the productivity of the process is more than 0.25 grams/minute per yarn end. More preferably, the productivity is more than 0.5 grams/minute per yarn end. Yet more preferably, the productivity is more than 1 grams/minute per yarn end. Still more preferably, the productivity is more than 2 grams/minute per yarn end. Most preferably, the productivity is more than 4 grams/minute per yarn end.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Comparative Example 1

A 540 denier, 50 filament (10.8 denier/filament) polyethylene feed yarn was gel-spun by the process of U.S. Pat. No. 4,551,296. The polyethylene comprising the yarn had an intrinsic viscosity in decalin at 135° C. of 13±1.5 dl/g, fewer than 1 methyl group per 1000 carbon atoms and less than 1 wt. % of other constituents. 1.3 wt. % of spin finish containing an anti-static agent had been applied to the external yarn surfaces. The tenacity of this feed yarn was 30±2 g/d as measured by ASTM D2256-97.

Multiple ends of this feed yarn were fed from a creel, through a set of restraining rolls at a speed $V_1$, meters/min into a forced convection air oven in which the internal temperature was 155±1° C. The air circulation within the oven was in a turbulent state with a time-averaged velocity in the vicinity of the yarn of about 34 meters/min.

The feed yarn passed through the oven in a straight line from inlet to outlet over a path length (L) of 7.32 meters and thence at constant tension to a second set of rolls operating at a speed $V_2$, meters/min. The yarn was cooled down on the second set of rolls at constant length neglecting thermal contraction.

The speed of the first set of rolls ($V_1$) and the speed of the second set of rolls ($V_2$) were varied to obtain a combination of high draw ratio and high mass throughput without filament breakage. The best condition was reached at a feed speed ($V_1$) of 8.0 m/min and a final speed of 19.68 m/min corresponding to a draw ratio ($V_2/V_1$) of 2.46 and a mass throughput of 0.48 g/min. The denier per filament (dpf) was reduced from 10.8 dpf for the feed yarn to 4.39 dpf for the drawn yarn. Yarn tenacity was increased from 30 g/d to 36 g/d as measured by ASTM D2256-97.

The above drawing conditions failed to satisfy Equation 1d in that the quantity $2L/(V_1+V_2)=[(2\times7.32)/(8.0+19.68)]=0.529$ was less than 0.55.

Example 1

A 650 denier, 60 filament (10.83 denier/filament) polyethylene feed yarn was gel-spun by the process of U.S. Pat. No. 4,551,296. The polyethylene comprising the yarn had an intrinsic viscosity in decalin at 135° C. of 13±1.5 dl/g, fewer than 1 methyl group per 1000 carbon atoms and less than 1 wt. % of other constituents. 1.3 wt. % of spin finish containing an anti-static agent had been applied to the external yarn surfaces. The tenacity of this feed yarn was 30±2 g/d.

Multiple ends of this feed yarn were fed from a creel, through a set of restraining rolls at a speed ($V_1$) of 8 meters/min into a forced convection air oven in which the internal temperature was 155±1° C. The air circulation within the oven was in a turbulent state with a time-averaged velocity in the vicinity of the yarn of about 34 meters/min.

The feed yarn passed through the oven in a straight line from inlet to outlet over a path length (L) of 14.63 meters and thence to a second set of rolls operating at a speed ($V_2$) of 33.2 meters/min. The yarn was cooled down on the second set of rolls at constant length neglecting thermal contraction. The yarn was thereby drawn in the oven at constant tension neglecting the effect of air drag.

The above drawing conditions in relation to Equations 1a-1d were as follows:

$0.25 \leq [L/V_1=1.83] \leq 20$, min  Eq. 1a $1.5 \leq [V_2/V_1=4.15] \leq 20$  Eq. 1b $1 \leq [(V_2-V_1)/L=1.72] \leq 60$, min$^{-1}$  Eq. 1c $0.55 \leq [2L/(V_1+V_2)=0.71] \leq 10$, min  Eq. 1d Hence, each of Equations 1a-1d were satisfied.

The denier per filament (dpf) was reduced from 10.83 dpf for the feed yarn to 1.80 dpf for the drawn yarn. Tenacity was increased from 30 g/d for the feed yarn to about 43 g/d for the drawn yarn. The mass throughput of drawn yarn was 0.58 grams/min per yarn end.

Relative to Comparative Example 1, the process of the invention yielded higher draw ratio, higher throughput, higher yarn tenacity and lower denier per filament. The drawn yarn of the invention had enhanced usefulness for anti-ballistic and penetration resistant armor, fishing line, composites, ropes, fabrics and other applications.

Examples 2-4

The same feed yarn as described in Example 1 was fed into the same forced convection air oven with the only changes in drawing conditions being the feed speed and the final speed. The drawing conditions, final yarn deniers, and mass throughputs per yarn end were as shown in Table I.

TABLE I

| Ex | $V_1$, m/min | $V_2$, m/min | $L/V_1$, min | $V_2/V_1$ | $(V_2-V_1)/L$, min$^{-1}$ | $2L/(V_1+V_2)$, min | Final yarn Denier | Mass Thruput g/min |
|---|---|---|---|---|---|---|---|---|
| 2 | 4.0 | 24.0 | 3.66 | 6.0 | 1.37 | 1.05 | 108 | 0.29 |
| 3 | 5.8 | 24.0 | 2.52 | 4.14 | 1.24 | 0.98 | 157 | 0.42 |
| 4 | 7.6 | 26.4 | 1.93 | 3.47 | 1.29 | 0.86 | 187 | 0.55 |

The drawing conditions in Examples 2-4 were seen to satisfy Equations 1a-1d.

Example 5

The same feed yarn as described in Example 1 was fed into a forced convection oven wherein the yarn path consisted of eight passes back and forth through the oven across idler rolls. The total yarn path length (L) within the oven was 24.38 meters. The feed yarn entered the oven at a velocity $V_1$ of 6.096 m/min and exited the oven at a velocity $V_2$ of 24.38 meters/min. The temperature within the oven was 151±3° C. The air circulation within the oven was in a turbulent state with a time-averaged velocity in the vicinity of the yarn of about 34 meters/min. The drawn yarn exiting the oven was cooled down at constant length neglecting thermal contraction. The yarn tension increased linearly from oven inlet to oven outlet.

The above drawing conditions in relation to Equations 2a to 2d were as follows:

$1 \leq [L/V_1=4.0] \leq 20$, min  Eq. 2a $1.5 \leq [V_2/V_1=4.0] \leq 20$  Eq. 2b $0.01 \leq [(V_2-V_1)/L=0.75] \leq 1$, min$^{-1}$  Eq. 2c $1.1 \leq [2L/(V_1+V_2)=1.6] \leq 10$, min  Eq. 2d Hence, each of Equations 2a-2d were satisfied.

The drawn yarn was of 155 denier (2.58 dpf) and 43 g/d tenacity. The mass throughput of drawn yarn was 0.42 grams/min per yarn end.

Example 6

A 1200 denier, 120 filament polyethylene feed yarn was gel-spun by the process of U.S. Pat. No. 4,551,296. The polyethylene comprising the feed yarn had an intrinsic viscosity in decalin at 135° C. of 13±1.5 dl/g, fewer than 1 methyl group per 1000 carbon atoms and less than 1 wt. % of other constituents. 1.3 wt. % of spin finish containing an anti-static agent had been applied to the external yarn surfaces. The tenacity of this feed yarn was 30±2 g/d.

This feed yarn was fed into a forced convection oven wherein the yarn path consisted of eight passes back and forth through the oven across idler rolls. The total yarn path length (L) within the oven was 24.38 meters. The feed yarn entered the oven at a velocity $V_1$ of 6.096 m/min and exited the oven at a velocity $V_2$ of 24.38 meters/min. The temperature within the oven was 151±3° C. The air circulation within the oven was in a turbulent state with a time-averaged velocity in the vicinity of the yarn of about 34 meters/min. The drawn yarn exiting the oven was cooled down at constant length neglecting thermal contraction. The yarn tension increased linearly from oven inlet to oven outlet.

The above drawing conditions in relation to Equations 2a-2d were as follows:

$$1 \leq [L/V_1 = 4.0] \leq 20, \text{min} \qquad \text{Eq. 2a}$$

$$1.5 \leq [V_2/V_1 = 4] \leq 20 \qquad \text{Eq. 2b}$$

$$0.01 \leq [(V_2 - V_1)/L = 0.75] \leq 1, \text{min}^{-1} \qquad \text{Eq. 2c}$$

$$1.1 \leq [2L/(V_1 + V_2) = 1.6] \leq 10, \text{min} \qquad \text{Eq. 2d}$$

Hence, each of Equations 2a-2d were satisfied.

The drawn yarn was of 315 denier and 40 g/d tenacity. The mass throughput of drawn yarn was 0.85 grams/min per yarn end.

Example 7

A 360 denier, 360 filament polyethylene feed yarn is gel-spun by the process of U.S. Pat. No. 6,448,359 B1. The polyethylene comprising the yarn has an intrinsic viscosity in decalin at 135° C. of 10±1.5 dl/g, fewer than 0.2 methyl groups per 1000 carbon atoms and less than 1 wt. % of other constituents. 1.3 wt. % of spin finish containing an anti-static agent is applied to the external yarn surfaces. The tenacity of this feed yarn is 46 g/d.

Multiple ends of this yarn are fed from a creel, through a set of restraining rolls at a speed ($V_1$) of 14 meters/min into a forced convection air oven in which the internal temperature is 155° C. in a first zone and 157° C. in a second zone. The air circulation within the oven is in a turbulent state with a time-averaged velocity in the vicinity of the yarn of more than 2 meters/min.

The yarn passes through the oven in a straight line from inlet to outlet over a path length (L) of 14.63 meters and thence to a second set of rolls operating at a speed ($V_2$) of 28 meters/min. The yarn is cooled down on the second set of rolls at constant length neglecting thermal contraction. The yarn is thereby drawn in the oven at constant tension neglecting the effect of air drag.

The above drawing conditions in relation to Equations 1a-1d are as follows:

$$0.25 \leq [L/V_1 = 1.05] \leq 20, \text{min} \qquad \text{Eq. 1a}$$

$$1.5 \leq [V_2/V_1 = 2.0] \leq 20 \qquad \text{Eq. 1b}$$

$$1 \leq [(V_2 - V_1)/L = 1.05] \leq 60, \text{min}^{-1} \qquad \text{Eq. 1c}$$

$$0.55 \leq [2L/(V_1 + V_2) = 0.67] \leq 10, \text{min} \qquad \text{Eq. 1d}$$

Hence, each of Equations 1a-1d are satisfied.

The drawn yarn is of 171 denier and 60 g/d tenacity. The mass throughput of drawn yarn is 0.56 grams/min per yarn end.

Examples 8-10

A 2060 denier, 120 filament polyethylene feed yarn is gel-spun by the process of U.S. Pat. No. 4,551,296. The polyethylene comprising the yarn has an intrinsic viscosity in decalin at 135° C. of 13±1.5 dl/g, fewer than 2 methyl groups per 1000 carbon atoms and less than 2 wt. % of other constituents. 1.3 wt. % of spin finish containing an anti-static agent is applied to the external yarn surfaces. The tenacity of this feed yarn is 21 g/d.

Multiple ends of this feed yarn are fed from a creel, through a set of restraining rolls at a speed of $V_1$ meters/min into a forced convection air oven in which the internal temperature is 147° C. in a first zone and 155° C. in a second zone. The air circulation within the oven is in a turbulent state with a time-averaged velocity in the vicinity of the yarn of more than 5 meters/min.

The yarn passes through the oven in a straight line from inlet to outlet over a path length (L) of 25 meters and thence to a second set of rolls operating at a speed of $V_2$ meters/min. The yarn is cooled down on the second set of rolls at constant length neglecting thermal contraction. The yarn is thereby drawn in the oven at constant tension neglecting the effect of air drag.

The feeds speeds and the final speeds are changed in Examples 8, 9 and 10 with other oven conditions remaining constant. The drawing conditions, final yarn deniers and mass throughputs are shown in Table II.

TABLE II

| Ex | $V_1$, m/min | $V_2$, m/min | $L/V_1$, min | $V_2/V_1$ | $(V_2 - V_1)/L$, min$^{-1}$ | $2L/(V_1 + V_2)$, min | Final yarn denier | Mass Thruput g/min |
|---|---|---|---|---|---|---|---|---|
| 8 | 20 | 64 | 1.25 | 3.2 | 1.76 | 0.60 | 644 | 4.58 |
| 9 | 15 | 75 | 1.67 | 5.0 | 2.40 | 0.56 | 412 | 3.43 |
| 10 | 10 | 65 | 2.50 | 6.5 | 2.20 | 0.67 | 317 | 2.29 |

The drawing conditions in Examples 8-10 are seen to satisfy Equations 1a to 1d.

Example 11

A 4000 denier, 120 filament polyethylene feed yarn is gel-spun by the process of U.S. Pat. No. 4,551,296. The polyethylene comprising the feed yarn has an intrinsic viscosity in decalin at 1350C of 13±1.5 dl/g, fewer than 2 methyl groups per 1000 carbon atoms and less than 2 wt. % of other constituents. 1.3 wt. % of spin finish containing an aniti-static agent is applied to the external yarn surfaces. The tenacity of this feed yarn is 7 g/d.

Multiple ends of this feed yarn are fed from a creel, through a set of restraining rolls at a speed ($V_1$) of 48 meters/min into a forced convection air oven in which the internal temperature is 147° C. in a first zone, 153° C. in a second zone and 155° C. in a third zone. The air circulation within the oven is in a turbulent state with a time-averaged velocity in the vicinity of the yarn of about 150 meters/min.

The yarn passes through the oven in a zig-zag path length (L) of 100 meters over idler rolls. The yarn tension in the oven increases linearly from inlet to outlet. The yarn exits the oven at a speed ($V_2$) of 312 meters/min and is cooled down at constant length neglecting thermal contraction. The above drawing conditions in relation to Equations 1a-1d are as follows:

$$0.25 \leq [L/V_1=2.08] \leq 20, \text{min} \qquad \text{Eq. 1a}$$

$$1.5 \leq [V_2/V_1=6.5] \leq 20 \qquad \text{Eq. 1b}$$

$$1 \leq [(V_2-V_1)/L=2.64] \leq 60, \text{min}^{-1} \qquad \text{Eq. 1c}$$

$$0.55 \leq [2L/(V_1+V_2)=0.56] \leq 10, \text{min} \qquad \text{Eq. 1d}$$

Hence, each of Equations 1a-1d are satisfied.

The drawn yarn is of 615 denier and 30 g/d tenacity. The mass throughput of drawn yarn is 24 grams/min per yarn end.

Example 12

A 10,000 denier, 240 filament polyethylene feed yarn is gel-spun by the process of U.S. Pat. No. 4,551,296. The polyethylene comprising the feed yarn has an intrinsic viscosity in decalin at 135° C. of 13±1.5 dl/g, fewer than 2 methyl groups per 1000 carbon atoms and less than 2 wt. % of other constituents. 1.3 wt. % of spin finish containing an anti-static agent is applied to the external yarn surfaces. The tenacity of this feed yarn is 7 g/d.

Multiple ends of this feed yarn are fed from a creel, through a set of restraining rolls at a speed ($V_1$) of 5 meters/min into a forced convection air oven in which the internal temperature is 147° C. in a first zone, 153° C. in a second zone and 155° C. in a third zone. The air circulation within the oven is in a turbulent state with a time-averaged velocity in the vicinity of the yarn of about 200 meters/min.

The yarn passes through the oven in a zig-zag path length (L) of 100 meters over idler rolls. The yarn tension in the oven increases linearly from inlet to outlet. The drawn yarn exits the oven at a speed ($V_2$) of 20.83 meters/min and is cooled down at constant length neglecting thermal contraction. The above drawing conditions in relation to Equations 2a-2d are as follows:

$$1 \leq [L/V_1=20] \leq 20, \text{min} \qquad \text{Eq. 2a}$$

$$1.5 \leq [V_2/V_1=4.17] \leq 20 \qquad \text{Eq. 2b}$$

$$0.01 \leq [(V_2-V_1)/L=0.16] \leq 1, \text{min}^{-1} \qquad \text{Eq. 2c}$$

$$1.1 \leq [2L/(V_1+V_2)=7.74] \leq 10, \text{min} \qquad \text{Eq. 2d}$$

Hence, each of Equations 2a-2d are satisfied. The drawn yarn is of 2400 denier and 28 g/d tenacity. The mass throughput of drawn yarn is 5.56 grams/min per yarn end.

Having thus described the invention in rather full detail, it will be understood that such detail need not be strictly adhered to but that further changes and modifications may suggest themselves to one skilled in the art, all falling with the scope of the invention as defined by the subjoined claims.

What is claimed is:

1. A process for drawing a gel-spun multi-filament yarn comprising the steps of:
  a) forming a gel-spun polyethylene multi-filament feed yarn comprising a polyethylene having an intrinsic viscosity in decalin at 135° C. of from 5 dl/g to 35 dl/g, fewer than two methyl groups per thousand carbon atoms, and less than 2 wt. % of other constituents;
  b) passing said feed yarn at a speed of $V_1$ meters/minute into a forced convection air oven having a yarn path length of L meters, wherein one or more zones are present along the yarn path having zone temperatures from 130° C. to 160° C. and wherein the air circulation in said oven is in a turbulent state;
  c) passing said feed yarn continuously through said oven and out of said oven at an exit speed of $V_2$ meters/minute wherein the following equations are satisfied $$0.25 \leq L/V_1 \leq 20, \text{min}$$

$$1.5 \leq V_2/V_1 \leq 20$$

$$1 \leq (V_2-V_1)/L \leq 60, \text{min}^{-1}$$

$$0.55 \leq 2L/(V_1+V_2) \leq 10, \text{min}$$

and wherein the mass throughput of yarn passing through the oven is at least 0.25 grams/minute per yarn end.

2. The process of claim 1 wherein the yarn is drawn at constant tension throughout the oven neglecting the effect of air drag.

3. The process of claim 1 wherein the yarn is drawn at increasing tension through the oven.

4. The process of claim 1 wherein the feed yarn comprises a polyethylene having an intrinsic viscosity in decalin at 13520 C. of from 8 dl/g to 30 dl/g, fewer than one methyl group per thousand carbon atoms, and less than 1 wt. % of other constituents, said feed yarn having a tenacity from 6 to 76 g/d as measured by ASTM D2256-97.

5. The process of claim 4 wherein the feed yarn has a tenacity from 11 to 66 g/d.

6. The process of claim 4 wherein the feed yarn has a tenacity from 16 to 56 g/d.

7. The process of claim 4 wherein the feed yarn has a tenacity from 21 g/d to 51 g/d.

8. The process of claim 4 wherein the feed yarn has a tenacity from 26 g/d to 46 g/d.

9. The process of claim 4 wherein the feed yarn comprises a polyethylene having an intrinsic viscosity in decalin at 135° C. of from 10 dl/g to 25 dl/g.

10. The process of claim 4 wherein the feed yarn comprises a polyethylene having an intrinsic viscosity in decalin at 135° C. of from 12 dl/g to 20 dl/g, fewer than 0.5 methyl groups per thousand carbon atoms, and less than 0.5 wt. % of other constituents, said feed yarn having a tenacity from 21 to 51 g/d.

11. The process of claim 1 additionally satisfying the condition that the mass throughput of yarn passing through the oven is at least 0.42 grams/minute per yarn end.

12. The process of claim 1 additionally satisfying the condition that the mass throughput of yarn passing through the oven is more than 0.5 grams/minute per yarn end.

13. The process of claim 1 additionally satisfying the condition that the mass throughput of yarn passing through the oven is more than 1 grams/minute per yarn end.

14. The process of claim 1 additionally satisfying the condition that the mass throughput of yarn passing through the oven is more than 4 grams/minute per yarn end.

15. A process for drawing a gel-spun multi-filament yarn comprising the steps of:
  a) forming a gel-spun polyethylene multi-filament feed yarn comprising a polyethylene having an intrinsic viscosity in decalin at 135° C. of from 5 dl/g to 35 dl/g, fewer tan two methyl groups per thousand carbon atoms, and less than 2 wt. % of other constituents;

b) passing said feed yarn at a speed of $V_1$ meters/minute into a forced convection air oven having a yarn path length of L meters, wherein one or more zones are present along the yarn path having zone temperatures from 130° C. to 160° C. and wherein the air circulation in said oven is in a turbulent state;

c) passing said feed yarn continuously through said oven and out of said oven at an exit speed of $V_2$ meters/minute wherein the following equations are satisfied $$1 \leq L/V_1 \leq 20, \text{ min}$$

$$1.5 \leq V_2/V_1 \leq 20$$

$$0.01 \leq (V_2-V_1)/L \leq 1, \text{ min}^{-1}$$

$$1.1 \leq 2L/(V_1+V_2) \leq 10, \text{ min}$$

and wherein the mass throughput of yarn passing through the oven is at least 0.25 grams/minute per yarn end.

16. The process of claim 15 wherein the yarn is drawn at constant tension throughout the oven neglecting the effect of air drag.

17. The process of claim 15 wherein the yarn is drawn at increasing tension through the oven.

18. The process of claim 15 wherein the feed yarn comprises a polyethylene having an intrinsic viscosity in decalin at 135° C. of from 8 dl/g to 30 dl/g, fewer than one methyl groups per thousand carbon atoms, and comprising less than 1 wt. % of other constituents, said feed yarn having a tenacity from 5 to 76 g/d as measured by ASTM D2256-97.

19. The process of claim 15 wherein the feed yarn has a tenacity from 11 to 66 g/d.

20. The process of claim 15 wherein the feed yarn has a tenacity from 16 to 56 g/d.

21. The process of claim 15 wherein the feed yarn has a tenacity from 21 to 51 g/d.

22. The process of claim 15 wherein the feed yarn has a tenacity from 26 to 46 g/d.

23. The process of claim 15 wherein the feed yarn comprises a polyethylene having an intrinsic viscosity in decalin at 135° C. of from 10 dl/g to 25 dl/g.

24. The process of claim 15 wherein the feed yarn comprises a polyethylene having an intrinsic viscosity in decalin at 135° C. of from 12 dl/g to 20 dl/g, fewer tan 0.5 methyl groups per thousand carbon atoms, and less than 0.5 wt. % of other constituents, said feed yarn having a tenacity from 21 to 51 g/d.

25. A process for drawing a gel-spun multi-filament yarn comprising the steps of:

(a) forming a gel-spun polyethylene multi-filament feed yarn comprising a polyethylene having an intrinsic viscosity in decalin at 135° C. of from 5 dl/g to 35 dl/g, fewer than two methyl groups per thousand carbon atoms, and less than 2 wt. % of other constituents;

(b) passing said feed yarn at a speed of $V_1$ meters/minute into a forced convection air oven having a yarn path length of L meters, wherein one or more zones are present along the yarn path having zone temperatures from 130° C. to 160° C. and wherein the air circulation in said oven is in a turbulent state;

(c) passing said feed yarn continuously through said oven and out of said oven at an exit speed of $V_2$ meters/minute wherein at least one of the following sets of equations are satisfied $$0.25 \leq L/V_1 \leq 20, \text{ min} \qquad \text{I.}$$

$$1.5 \leq V_2/V_1 \leq 20$$

$$1 \leq (V_2-V_1)/L \leq 60, \text{ min}_{-1}$$

$$0.55 \leq 2L/(V_1+V_2) \leq 10, \text{ min. and}$$

$$1 \leq L/V_1 \leq 20, \text{ min} \qquad \text{II.}$$

$$1.5 \leq V_2/V_1 \leq 20$$

$$0.01 \leq (V_2-V_1)/L \leq 1, \text{ min}^{-1}$$

$$1.1 \leq 2L/(V_1+V_2) \leq 10, \text{ min,}$$

and wherein the mass throughput of yarn passing through the oven is more than 0.5 grams/minute per yarn end.

26. The process of claim 25 wherein the mass throughput of yarn passing through the oven is more than 1 grams/minute per yarn end.

27. The process of claim 25 wherein said feed yarn is in an essentially undrawn state prior to passing said feed yarn into said oven.

28. The process of claim 25 including the steps of winding up said feed yarn on a creel and subsequently feeding said feed yarn from said creel into said oven.

* * * * *

UNITED STATES PATENT AND TRADEMARK OFFICE
CERTIFICATE OF CORRECTION

PATENT NO. : 7,344,668 B2
APPLICATION NO. : 10/699416
DATED : March 18, 2008
INVENTOR(S) : Charles R Arnett et al.

It is certified that error appears in the above-identified patent and that said Letters Patent is hereby corrected as shown below:

Col. 12 line 14

The third equation in Claim 1 should read as follows:

$$1 \leq (V_2 - V_1)/L \leq 60, \min^{-1}$$

Signed and Sealed this

Fifth Day of May, 2009

JOHN DOLL
*Acting Director of the United States Patent and Trademark Office*